Dec. 1, 1942.　　　A. K. SMITH　　　2,304,029
VENTILATING SYSTEM FOR TELEPHONE BOOTHS
Filed May 27, 1941　　　2 Sheets-Sheet 1

INVENTOR
A. K. SMITH
BY J. MacDonald
ATTORNEY

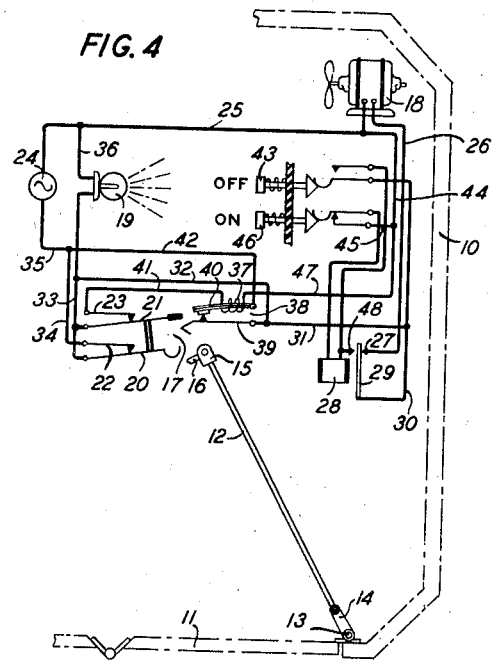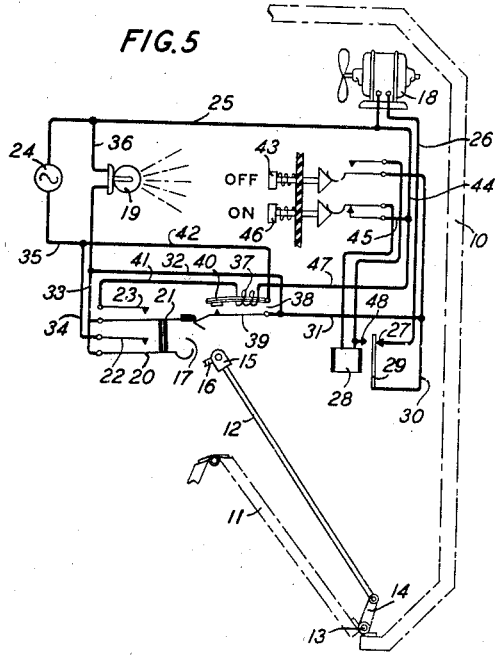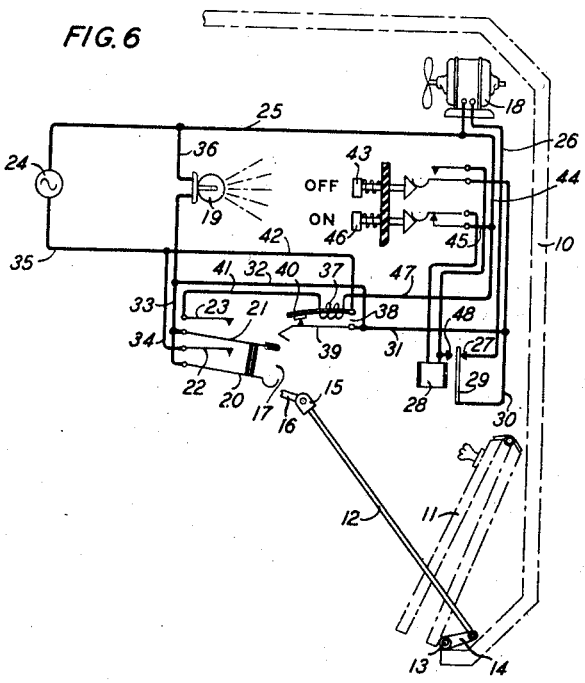

Patented Dec. 1, 1942

2,304,029

UNITED STATES PATENT OFFICE 2,304,029

VENTILATING SYSTEM FOR TELEPHONE BOOTHS

Albert K. Smith, West Orange, N. J., assignor to Bell Telephone Laboratories, Incorporated, New York, N. Y., a corporation of New York Application May 27, 1941, Serial No. 395,426

4 Claims. (Cl. 98—29)

This invention relates to telephone booths and more particularly to the type of booth which is ventilated by a motor-driven fan controlled automatically by the operation of the booth door and also under the control of the patron by means of push-buttons located in the booth.

An object of this invention is the provision of a telephone booth in which the vitiated air in the booth is expelled, after the occupant leaves the booth and the door is opened, by maintaining the fan in operation a predetermined length of time after the booth has been vacated and in case the fan has been shut off by the patron while using the booth, by automatically restarting the fan by the opening of the booth door.

A further object of the invention is the provision of a telephone booth in which the ventilating fan will automatically start to operate when the door is closed irrespective of whether or not the fan had been shut off by the previous patron.

In the present type of telephone booth, the fan which is installed therein for the purpose of ventilating the booth, is either automatically turned on and off by the operation of the booth door or it is under the manual control of the occupant of the booth. In both types of ventilating systems, referred to above, the fan is only in operation when the booth door is closed, since in the first case the operation of the fan is wholly controlled by the operation of the booth door and in the second case the occupant can only turn on the fan when the booth door is closed due to the fact that the circuit for operating the fan leads through contacts of the door-operated switch.

Since the fan is only in operation when the booth door is closed, only a limited amount of vitiated air can be expelled from the booth and the fan merely serves to stir up the air. It therefore follows that only a very limited amount of air will be forced from the booth; that is the air which is forced out around the joints between the door and booth proper. In the case of the manually controlled booth the previous occupant may have had the fan turned off, thereby creating a considerable amount of vitiated air which it is desirable to forcibly expel before the next patron enters the booth.

In accordance with my invention I have provided a switch actuated by the operation of the both door for controlling the lamp and fan circuit, and I associate with said switch a thermostatic switch having a heating coil, said heating coil being adapted to be energized when the door is closed and the first-named switch operated. The thermostatic switch when operated by the heat of its heating element provides a circuit for the fan in parallel with its original energizing circuit to maintain the fan in operation a predetermined length of time after the fan contacts on the main switch have opened due to the opening of the door booth when the patron leaves the booth. In order that the occupant of the booth may shut the fan off when he desires to do so, I have associated with the fan circuit manually operated means for turning the fan on and off. However, if the fan has been turned off, means is provided whereby the fan will start and remain in operation a predetermined length of time after the door has been opened as the patron leaves the booth and will automatically be put into operation when the next occupant of the booth closes the door irrespective of whether or not the push-button switches have been used.

The features of my invention will be readily understood from the following detailed description made with reference to the accompanying drawings in which:

Fig. 4 is a view similar to Fig. 3 except that the fan has been started by means of the manual operation of the on-control button of the manually controlled switch;

Fig. 5 is a view similar to Fig. 3 except that the circuit of the relay has been opened by the momentary opening of the thermostatic switch thereby starting the fan as the door is opened; and Fig. 6 is a view similar to Fig. 1 except that the fan is maintained in operation due to the thermostatic switch being closed.

Figure 1:
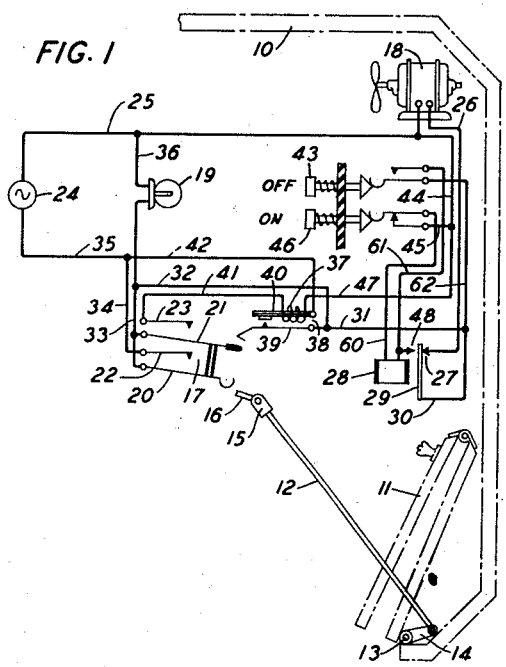
Fig. 1 is a schematic top plan view of a telephone booth with the booth door in its open position and the lamp and fan switch in its normal or unoperated position.

As shown in Fig. 1 the telephone booth 10 is indicated by the dot and dash lines and is provided with the usual folding door 11. Secured to the door 11 and arranged to be operated thereby is a rod 12 one end of which is pivotally mounted on the door hinge 13 by means of the link member 14. The other end of the rod 12 terminates in a clevis 15, to which is pivotally secured a link 16 which in turn is secured to the switch-operating mechanism, shown for example in Patent No. 2,093,679 to F. A. Kuntz, September 21, 1937.

Figure 1A:
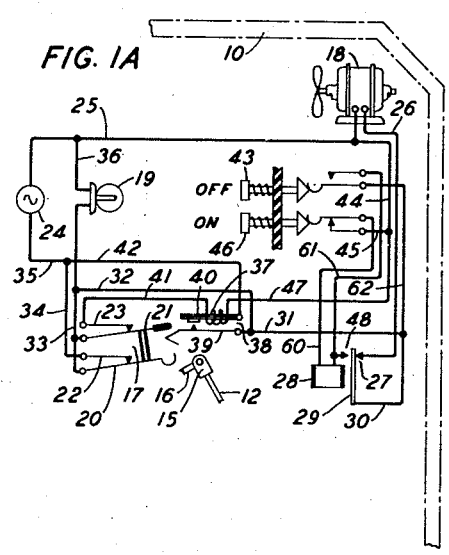
Fig. 1A is a view similar to Fig. 1 except that the lamp and fan switch have been closed by the closing of the door thereby lighting the lamp and starting the fan.

The door-operated switch 17, for controlling the operation of the fan 18 and the lamp 19, is schematically shown and comprises a pair of arms 20 and 21 which are actuated by means of the lever 16 which in turn is actuated by the rod 12 when the door 11 is operated. A pair of cooperating contact springs 22 and 23, which when the door is closed, as shown in Fig. 1A, closes a circuit to the fan 18 and the lamp 19.

The circuit for operating the fan 18 may be traced from one side of the current source 24 over conductor 25 to the fan 18, from the fan 18 over conductor 26, through the closed contact 27 of the relay 28, through armature 29 over conductors 30, 31, 32 and 33 to the arm 20 of the door-operated switch 17, and the closed contact on the spring 22 over conductors 34 and 35 to the other side of the current source 24.

The circuit for controlling the operation of the lamp is controlled by the same set of contact springs 20 and 21 on the switch 17 and may be traced from one side of the current source 24 over conductors 25 and 36 to the lamp 19, from the lamp 19 over conductor 33 to the arm 20, through the closed contact spring 22, over conductors 34 and 35 to the current source 24. Thus it is apparent that the closing of the contact springs 22 and 20 on the door-operated switch 17 causes the fan 18 to be put into operation and the lamp 19 to be lighted as shown in Fig. 1A.

Figure 2:
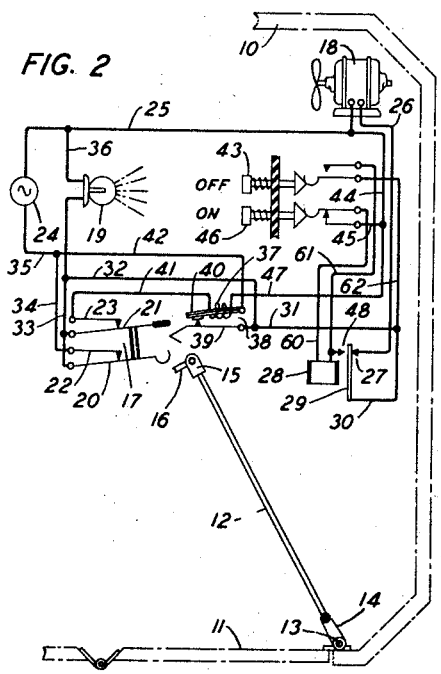
Fig. 2 is a view similar to Fig. 1A except that the thermostatic switch connected in the fan circuit has closed due to the heating coil associated therewith which has been energized by the closing of the fan switch.

With the door 11 of the booth 10 closed as shown in Fig. 2, and the circuit set up as above described, a circuit over conductors 25, 44, 47 and 41, arm 21 and contact spring 23 on the door-operated switch 17 will also be completed to energize the heating coil 37. This heating coil is located close to the thermostatic switch 38 which comprises a switch arm 39 and a bimetallic contact spring 40. The purpose of the thermostatic switch 38 is to maintain the fan 18 in operation after the door-operated switch 17 has been actuated and the lamp 19 has been extinguished by the opening of the telephone booth door. This is accomplished by heating the bimetallic contact spring 40 until it flexes and closes a parallel circuit to the fan through contact spring 40 and the lever arm 39.

As shown in Fig. 2 this circuit may be traced from one side of the current source 24 over conductor 25 to the fan 18, from fan 18 over conductor 26, closed contact 27 of relay 28 through armature 29, over conductor 31 to the arm 39, through the arm 39, closed contact of the bimetallic contact spring 40 over conductors 42 and 35 to the other side of the current source 24.

Figure 3:
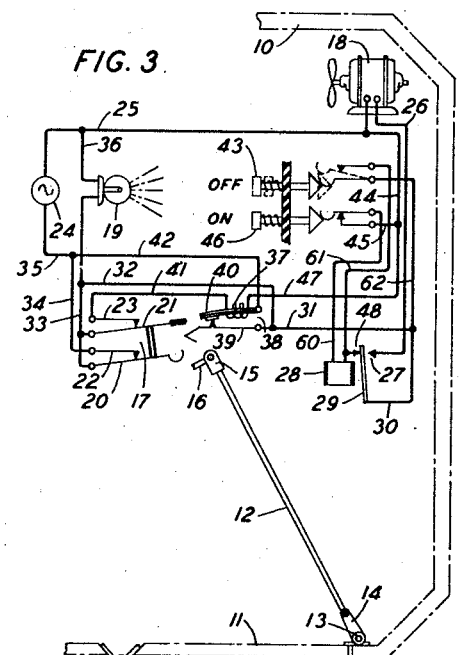
Fig. 3 is a view similar to Fig. 2 except that the fan has been stopped by the momentary operation of the off-control button of the manually operated switch.

With the condition as shown in Fig. 2, the fan 18 will be in operation and the lamp 19 will be lighted due to the fact that the door-operated switch 17 has been closed by the closing of the booth door 11. In the event that the occupant of the booth does not desire to have the fan in operation, he may stop it by depressing the push-button 43 of the manually operated switch. This push-button operates but momentarily and causes the relay 28 to be energized thereby opening the circuit to the fan and stopping the operation thereof. This circuit is from source 24, conductors 25, 44, normal contact of switch 32, conductor 60, relay 28, conductor 61, contacts of off-switch 43, conductors 62, 31, 32, 33, contacts 20, 21 of switch 17, conductors 34, 35 to source 24. Relay 28 locks up when operated in this circuit. In the condition as shown in Fig. 3 the fan will remain out of service as long as the relay 28 remains energized and the contact between the armature 29 and the contact 27 remains open. The locking circuit for the relay 28 may be traced as follows: From current source 24, over conductors 25, 44 and 45, through the closed contacts of the push-button switch 46 to one side of the relay 28, through the relay 28, closed contact 48 and armature 29 over conductors 30 and 31 to the arm 39 through the closed contacts of the thermostatic switch 38 and the bimetallic spring 40 and back to the other side of the current source 24 over the conductors 42 and 35. Should the occupant of the booth desire to put the fan into operation again, the push-button key 46 is depressed momentarily as shown in Fig. 4. This causes the relay 28 to be deenergized thus allowing armature 29 to fall back and engage the contact 27 thus reestablishing the fan circuit and putting the fan in operation over the circuit heretofore described. The fan 18 will continue to run as long as thermostatic switch 38 or the door-operated switch 17, remains closed, which will be during all the time that the booth is occupied and the door is closed and also for a predetermined length of time after the door is opened as shown in Fig. 6.

In the event that the occupant of the booth does not restart the fan before leaving the booth, the opening of the booth door 11 as shown in Fig. 5 will cause the arm 21 of the door-operated switch 17 to strike the arm 39 of the thermostatic switch 38 thereby opening the locking circuit of the relay 28. This will cause the armature 29 to fall away and engage the contact 27, thus completing the circuit to the fan 18 and putting the fan into operation over the circuit established through the thermostatic switch 38 and the fan will continue to run until the heat absorbed by the bimetallic spring 40 is dissipated at which time the spring will return to normal and the condition as shown in Fig. 1 will prevail.

While there is shown and described herein the preferred embodiment of my invention, it is to be understood that it is not limited or confined to the precise details of construction herein described and that various modifications may be made therein without departing from the spirit of the invention and I am only limited by the scope of the appended claims.

What is claimed is:

1. A ventilating system for telephone booths and the like comprising an enclosure, a door for gaining access to said enclosure, an electrically driven fan located in said enclosure for the ventilation thereof, a circuit for said fan, a circuit including the winding of a thermal contact device, a switch actuated by said door as it is closed for closing said circuits, a circuit including a contact on said thermal device and said fan and closed when said thermal device operates, said thermal device maintaining said last circuit closed and the fan in operation for a predetermined interval after said original fan circuit is opened by the opening of said door.

2. A ventilating system for telephone booths and the like comprising an enclosure, a door for gaining access to said enclosure, an electrically driven fan located in said enclosure for the ventilation thereof, a lamp in said enclosure for the illumination thereof, a circuit therefor, a circuit for said fan, a circuit including the winding of a thermal contact device, a switch actuated by said door as it is closed for closing said circuits, a circuit including a contact on said thermal device and said fan and closed when said thermal device operates, said thermal device maintaining said fan circuit closed and the fan in operation for a predetermined interval after said first fan circuit and said lamp circuit have been opened by the opening of said door.

3. A ventilating system for telephone booths and the like comprising an enclosure, a door for gaining access to said enclosure, an electrically driven fan located in said enclosure for the ventilation thereof, a circuit for said fan, a switch actuated by said door as it is closed for closing said fan circuit, a second circuit for said fan in parallel with the original energizing circuit, a thermal contact device controlling said second circuit and operated an interval after the door is closed, a manually operated switch adapted to open the fan circuit, and means actuated by the opening of said door, in case the fan circuit has been opened, to reclose the fan circuit and restore it to the control of the thermal contact device.

4. A ventilating system for telephone booths, and the like comprising an enclosure, a door for gaining access to said enclosure, an electrically driven fan located in said enclosure for the ventilation thereof, a circuit for said fan, a switch actuated by said door as it is closed, for closing the said fan circuit, a second circuit for said fan in parallel with the original fan circuit, a thermal contact device controlling said second circuit and operated an interval after the door is closed, a pair of manually operated switches, one of said switches adapted to open the fan circuit and the other to close it, a circuit including a relay for opening said fan circuit and controlled by one of said manual switches, a locking circuit for said relay closed upon its operation and including a contact of the thermal device, and an arm carried by the door switch and upon the opening of the door momentarily opening the contact in said locking circuit to release said relay to restart the fan and restore it to the control of the thermal device.

ALBERT K. SMITH.